(12) United States Patent
Castro et al.

(10) Patent No.: US 10,531,293 B2
(45) Date of Patent: *Jan. 7, 2020

(54) SOCIAL AND PROXIMITY BASED ACCESS CONTROL FOR MOBILE APPLICATIONS

(71) Applicant: INTERNATIONAL BUSINESS MACHINES CORPORATION, Armonk, NY (US)

(72) Inventors: Paul C. Castro, Sharon, MA (US); Yunwu Huang, Chappaqua, NY (US); Marco Pistoia, Amawalk, NY (US); Umut Topkara, Scarsdale, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 455 days.

This patent is subject to a terminal disclaimer.

(21) Appl. No.: 15/280,697

(22) Filed: Sep. 29, 2016

(65) Prior Publication Data

US 2017/0019412 A1 Jan. 19, 2017

Related U.S. Application Data

(63) Continuation of application No. 14/030,552, filed on Sep. 18, 2013, now Pat. No. 9,479,512, which is a (Continued)

(51) Int. Cl.
*H04W 12/06* (2009.01)
*H04W 12/04* (2009.01)
(Continued)

(52) U.S. Cl.
CPC ........... *H04W 12/06* (2013.01); *H04L 63/104* (2013.01); *H04L 63/105* (2013.01); (Continued)

(58) Field of Classification Search
CPC ..... H04L 63/105; H04L 63/107; H04L 63/20; H04L 29/06; H04W 12/06; H04W 12/12; (Continued)

(56) References Cited

U.S. PATENT DOCUMENTS 8,045,961 B2   10/2011   Ayed et al.
8,584,219 B1   11/2013   Toole et al.
(Continued)

OTHER PUBLICATIONS

Office Action dated Jan. 20, 2016 for U.S. Appl. No. 14/030,552. (Continued)

*Primary Examiner* — Jayesh M Jhaveri
(74) *Attorney, Agent, or Firm* — Tutunjian & Bitetto, P.C.; Daniel P. Morris

(57) ABSTRACT

Systems for proximity-based access control include a proximity module configured to determine whether a distance from a first mobile device to each of one or more safe mobile devices falls below a threshold distance; a policy engine comprising a processor configured to determine whether a number of safe mobile devices within the threshold distance exceeds a safe gathering threshold; and a security module configured to activate a safe gathering policy in accordance with the safe gathering threshold that decreases a security level in the first mobile device.

20 Claims, 6 Drawing Sheets

Related U.S. Application Data continuation of application No. 13/733,559, filed on Jan. 3, 2013, now Pat. No. 9,473,507.

(51) Int. Cl.
*H04L 29/06* (2006.01)
*H04W 12/08* (2009.01)
*H04W 12/00* (2009.01)

(52) U.S. Cl.
CPC ............ *H04L 63/107* (2013.01); *H04L 63/20* (2013.01); *H04W 12/04* (2013.01); *H04W 12/08* (2013.01); *H04W 12/00503* (2019.01)

(58) Field of Classification Search
CPC ..... H04W 12/00; H04W 12/04; H04W 12/08; G06F 21/6218
See application file for complete search history.

(56) References Cited

U.S. PATENT DOCUMENTS

| | | | |
|---|---|---|---|
| 10,237,734 B2 * | 3/2019 | Castro | H04L 63/105 |
| 2006/0236092 A1 | 10/2006 | Hamalainen | |
| 2007/0239615 A1 * | 10/2007 | Matsuzaki | G06K 19/07749 705/55 |
| 2008/0172715 A1 | 7/2008 | Geiger et al. | |
| 2009/0210702 A1 | 8/2009 | Welingkar et al. | |
| 2010/0005523 A1 | 1/2010 | Hassan et al. | |
| 2010/0022217 A1 * | 1/2010 | Ketari | H04M 1/6066 455/411 |
| 2010/0048167 A1 * | 2/2010 | Chow | H04L 29/12594 455/410 |
| 2010/0088367 A1 | 4/2010 | Brown et al. | |
| 2010/0088696 A1 | 4/2010 | Stoev et al. | |
| 2011/0010761 A1 | 1/2011 | Doyle | |
| 2011/0105090 A1 | 5/2011 | Shackleton | |
| 2011/0293095 A1 | 12/2011 | Ben Ayed | |
| 2011/0314539 A1 | 12/2011 | Horton | |
| 2012/0072998 A1 * | 3/2012 | Motoyama | G06Q 10/109 726/30 |
| 2012/0131155 A1 | 5/2012 | Madey et al. | |
| 2012/0185910 A1 | 7/2012 | Miettinen | |
| 2013/0055348 A1 * | 2/2013 | Strauss | G06F 21/31 726/3 |
| 2013/0078979 A1 * | 3/2013 | Bell | H04W 48/04 455/418 |
| 2013/0091537 A1 | 4/2013 | Parla et al. | |
| 2013/0254831 A1 | 9/2013 | Roach et al. | |
| 2013/0324081 A1 * | 12/2013 | Gargi | H04M 1/67 455/411 |
| 2014/0130127 A1 * | 5/2014 | Toole | G06F 21/60 726/3 |
| 2014/0157401 A1 | 6/2014 | Alameh et al. | |
| 2014/0187160 A1 * | 7/2014 | Prencipe | H04W 4/80 455/41.2 |
| 2014/0373104 A1 | 12/2014 | Gaddam et al. | |

OTHER PUBLICATIONS

Office Action dated Jan. 2, 2015 for U.S. Appl. No. 14/030,552.
Bardram, J., et al. "Context-Aware User Authentication—Supporting Proximity-Based Login in Pervasive Computing" UbiComp 2003: Ubiquitous Computing, 5th International Conference. Oct. 2003. pp. 107-123.
Shamir, A. "How to Share a Secret" Communications of the ACM, vol. 22, No. 11. Nov. 1979. pp. 612-613.

* cited by examiner

SOCIAL AND PROXIMITY BASED ACCESS CONTROL FOR MOBILE APPLICATIONS

BACKGROUND

Technical Field

The present invention relates to network device security and, more particularly, to securing mobile devices in accordance with social and locational context cues.

Description of the Related Art

When users interact with their mobile devices, the interactions are dominated by short, focused uses performed in the context of other activities. For example, the user may check a smartphone several times over the course of an evening for information. However, for users who also use their devices in contexts where security policies are in place, the users may be frustrated by device-level lockdowns that force the user to authenticate on the device, even for non-sensitive application access.

Accessing protected resources on the device or over a network frequently requires entering a username and password or some other manual data entry. Such a task is onerous to mobile users, as it weakens the ability for the device to provide "information at your fingertips" functions. For example, if a user needs to check directions, read an email, and update a social media site over the course of a night, each function may necessitate re-authentication. Similarly, if a user is in a meeting and needs to access information relating to the business at hand, being forced to authenticate delays access to the information without providing any security benefit.

SUMMARY

A method for proximity-based access control is shown that includes determining whether a distance from a first mobile device to each of one or more safe mobile devices falls below a threshold distance; determining whether a number of safe mobile devices within the threshold distance exceeds a safe gathering threshold with a processor; and activating a safe gathering policy in accordance with the safe gathering threshold that decreases a security level in the first mobile device.

A method for proximity-based access control is shown that includes determining whether a distance from a first mobile device to each of one or more safe mobile devices falls below a threshold distance based on an identifier and a signal strength magnitude received from each of said one or more safe mobile devices; determining whether a number of safe mobile devices within the threshold distance exceeds a safe gathering threshold with a processor; activating a safe gathering policy in accordance with the safe gathering threshold that decreases a security level in the first mobile device that implements one or more authentication schemes that are less strict than a default authentication scheme; and periodically verifying that the number of safe mobile devices exceeds the safe gathering threshold and, if not, deactivating the safe gathering policy.

A system for proximity-based access control is shown that includes a proximity module configured to determine whether a distance from a first mobile device to each of one or more safe mobile devices falls below a threshold distance; a policy engine comprising a processor configured to determine whether a number of safe mobile devices within the threshold distance exceeds a safe gathering threshold; and a security module configured to activate a safe gathering policy in accordance with the safe gathering threshold that decreases a security level in the first mobile device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles provide a fine-grained security policy trigger by recognizing "safe gatherings," which are conditions where it is reasonably certain that the device is in safe hands. Recognizing a safe gathering may be accomplished using fine-grained context triggers that take into account social context (such as the presence of other known users in the area), the purpose of the gathering, users' roles, their professional and social relationships, and location. Fine-grained policy triggers and associated context information provided by safe gatherings can be used to dynamically adapt security policies, such as activity timeout periods for screen locks, or to adapt access control policies that govern the sensitivity of resources that may be accessed.

Mobile devices are often equipped with sensors that provide real-time localization information as well as the ability to attach to networks within range of their radios. Furthermore, social network information for people can be made available to select applications or can be derived by analyzing information that is present on the mobile devices, such as call history, email, text messages, and contact lists. This information can be used collectively to define a safe gathering policy, which specifies the conditions under which the safe gathering policy becomes active and a level of security for the device associated with the activation of the safe gathering policy.

Figure 1:
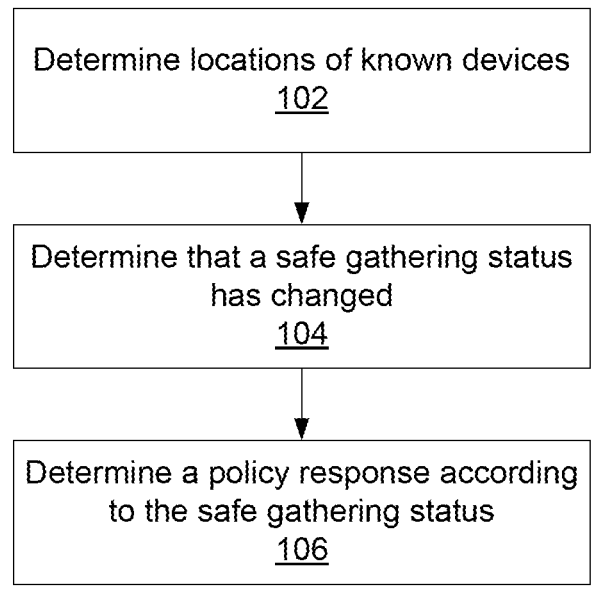
FIG. 1 is a block/flow diagram of a method for proximity-based access control in accordance with the present principles.

Referring now to the drawings in which like numerals represent the same or similar elements and initially to FIG. 1, a high-level method of adapting security policies according to social context is shown. Block 102 determines the locations of known users. This may be performed directly using on-device sensors such as, e.g., Bluetooth or near field communications, by local network discovery, or by using server-mediated localization. Other methods of detection may include receiving wireless signals from identification badges carried by users and consulting with a keycard system that records the entry of individuals into a room.

Block 104 determines which users are within a threshold distance of the mobile device. The identities of such nearby users are used to determine whether the mobile device is in a safe gathering. The identities of safe gathering users may be set by the owner of the mobile device or may be set by a policy administrator. Furthermore, there may be several levels of safe gatherings according to clearance levels of nearby users and the sensitivity of material on the mobile device. For example, each user may have an associated clearance level, with the safe gathering level corresponding to the lowest clearance level present. Similarly, an organizational chart may be used to determine whether a group of users are within a given branch of the organization—this allows for easier access to sensitive work-related data when in the presence of coworkers, but locks down devices in the presence of users from other parts of the company, allowing for greater information segregation.

Block 106 determines a policy response that corresponds to the determined safe gathering level. For example, for a very safe gathering, a screen-lock timeout may be significantly extended to increase the convenience of the users. In another embodiment, a safe gathering policy may remove the need for authentication entirely, with the security assurances being provided by the safe gathering. In contrast, an unsafe gathering may result in a decrease of the screen-lock timeout and a restriction of access to specific applications or functions on the mobile device. Block 106 may further prompt the user to activate the safe gathering policy. This allows the user to override the loosening of security if the user knows of contextual information that is not available to the device.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
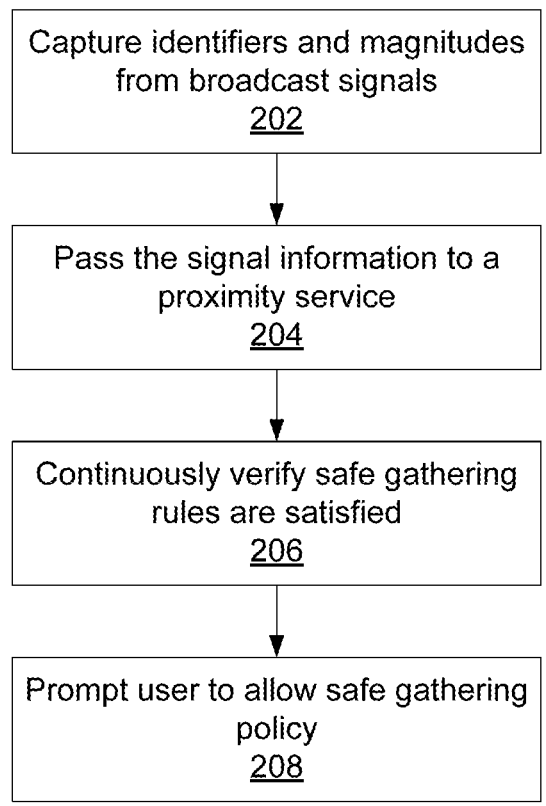
FIG. 2 is a block/flow diagram of a method for proximity-based access control in accordance with the present principles.

Referring now to FIG. 2, a method for triggering a safe gathering policy according to scheduling and pre-established safe zones is shown. Block 202 captures signals that have been broadcast at a mobile device and extracts information including identifiers and the magnitude of the receiving signals. This information is passed to a proximity service 204, which may be implemented on the mobile device as an application or may be offloaded to a server.

Block 206 determines how far away the respective signal origins are and compares the collected proximities to one or more safe gathering rules. This verification may be performed continuously, such that the departure or arrival of a device may be recognized and decisions regarding the security level may be made in real-time. It should be recognized that the determination of proximity according to signal strength utilizes knowledge regarding the original signal strength. Proximity may be determined by comparing a received signal strength to the known original signal strength, where the signal strength diminishes with distance according to an inverse-square relationship. The original signal strength may be stored on a per-user basis or may be determined according to the properties of the received signal. For example, an identifier in the signal may indicate a make and model of the transmitter, with such make and model being associated with a known transmission strength. As above, block 208 prompts the user to allow the activation of the safe gathering policy.

The recognized devices need not be other mobile devices. Instead, the devices may be any device capable of wireless transmission, such as wireless access points or specialized devices used to establish a safe space. Global positioning system (GPS) signals may also be used to establish a device's location relative to a safe space. Using such fixed transmission points, a volume of physical space may be defined by providing ranges for the mobile device's distance from the fixed points. If a device occupies such a safe space, the device may satisfy a safe gathering rule. The safe space may further be coordinated with a known schedule, such that a safe gathering policy is only activated when a user is in the safe space and a meeting has been scheduled in that space.

As described above, the safe gathering policies should be dynamic, such that the mobile device continuously checks to ensure that pre-conditions for the safe gathering policy remain in effect. If the conditions change, for example due to a location change, the mobile device may apply a default policy and tighten security. Exemplary policies include a re-authentication policy that determines that the mobile device may be unlocked without asking for a password or, may be unlocked with a weaker credential. Similarly, when safe gathering conditions are no longer present, the safe gathering trigger may inform a policy engine that the conditions for safe gathering are no longer present, and default policies may be put into effect. It may also be possible in some cases to implement a policy that makes security even more strict than the default. This is particularly advantageous in the case of geographical triggers, as triggering high security by the proximity of a mobile device could be circumvented merely by turning off the mobile device.

Figure 3:
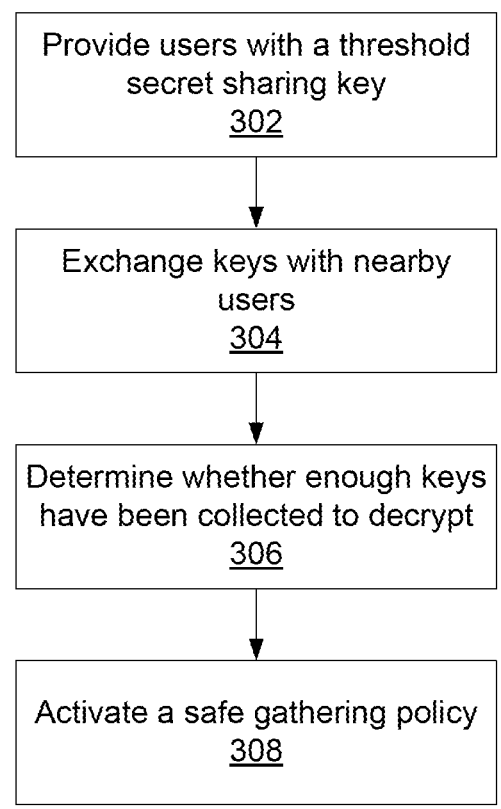
FIG. 3 is a block/flow diagram of a method for proximity based access control in accordance with the present principles.

Referring now to FIG. 3, a method for the ad hoc formation of safe gatherings is shown. Block 302 provides users with a cryptographic key according to a threshold secret sharing scheme. In such a system, a set of n keys are distributed among users, with any subset having at least m of said keys being sufficient to decrypt. Keys may be distributed across the user's social network, such that a sufficiently high concentration of users with threshold keys in an area will trigger the safe gathering. Block 304 exchanges the keys with nearby users until block 306 determines that enough of the keys have been collected to activate a safe gathering. This threshold number may be set by the user or may be set according to safe gathering policies. Block 308 activates a safe gathering policy, allowing more freedom to the device users.

It should be noted that measures may be taken to prevent malicious users from hijacking or disrupting safe gatherings. If a malicious user were able to simulate the conditions for a safe gathering, the malicious user could then trick mobile devices into lowering their security levels. In the case of a threshold secret system, for example, a malicious user who collected a threshold number of keys could use those keys to fool any of the devices into believing it was in a safe gathering.

To address this risk, additional information may be used to ensure that all users are authorized. For example, a certificate exchange may be used to establish a user's identity. Furthermore, cheater detection schemes can, within some limits, determine that a user is cheating and not presenting a valid key. In a safe gathering policy that needs, for example, three specific devices A, B, and C to be present, the devices may first exchange authentication certificates to establish identities and then exchange keys to establish the shared secret. The shared secret may be used to exchange information securely and to ensure that no outside attackers can break into the safe gathering. By authenticating first, the risk of a man-in-the-middle attack obtaining access to the full key can be avoided.

Figure 4:
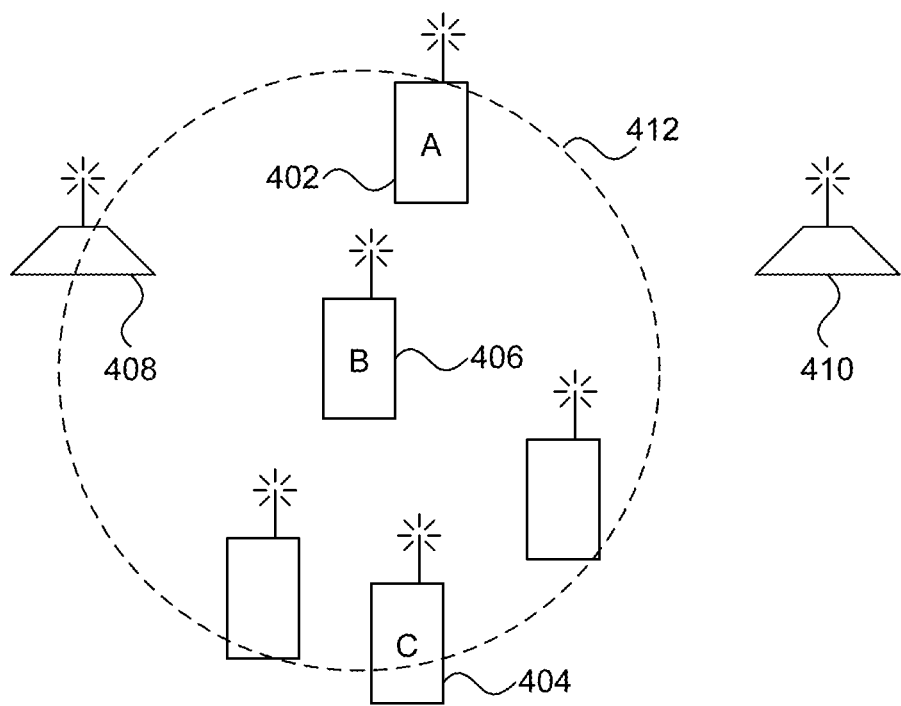
FIG. 4 is a diagram of an exemplary arrangement of devices illustrating proximity-based access control in accordance with the present principles.

Referring now to FIG. 4, an exemplary arrangement of safe mobile devices 406, 404, and 406 and fixed broadcasting stations 408 and 410 is shown. Several scenarios for the determination of a safe gathering may be considered. In a first scenario, consider mobile device B 406, which is in the middle of the group of users. All of the users are close to B, such that a sufficient number of safe devices are nearby to qualify as a safe gathering.

Figure 5:
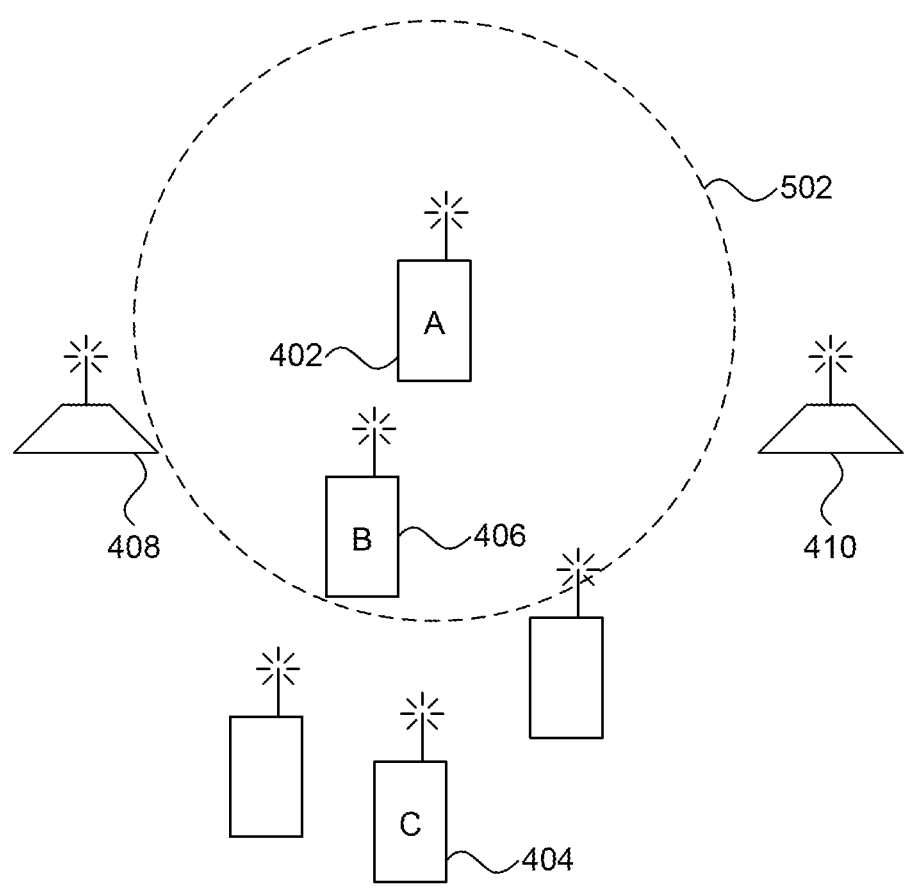
FIG. 5 is a diagram of an exemplary arrangement of devices illustrating proximity-based access control in accordance with the present principles.

Referring now to FIG. 5, the same arrangement of devices is shown, considered from a mobile device 402 at the edge of the group. While conditions may be sufficient for mobile device B 406, the locations of the other users in the gathering may give rise to a safe gathering at those positions. For example, mobile device A 402 is at the edge of the group, such that the devices on the far edge of the group (such as device C 404) may fall outside the threshold range. This may be acceptable in some embodiments, such as a social environment where devices at the edge of the group may not have any greater guarantee of safety than those at its core. However, it would be inconvenient for users at a meeting to have differing levels of security based on where they sit. The problem of excluded edge users may be addressed by maintaining a database of user locations at a central server (not shown), such that the server can make determinations regarding group size and cohesion before activating safe gathering policies.

Figure 6:
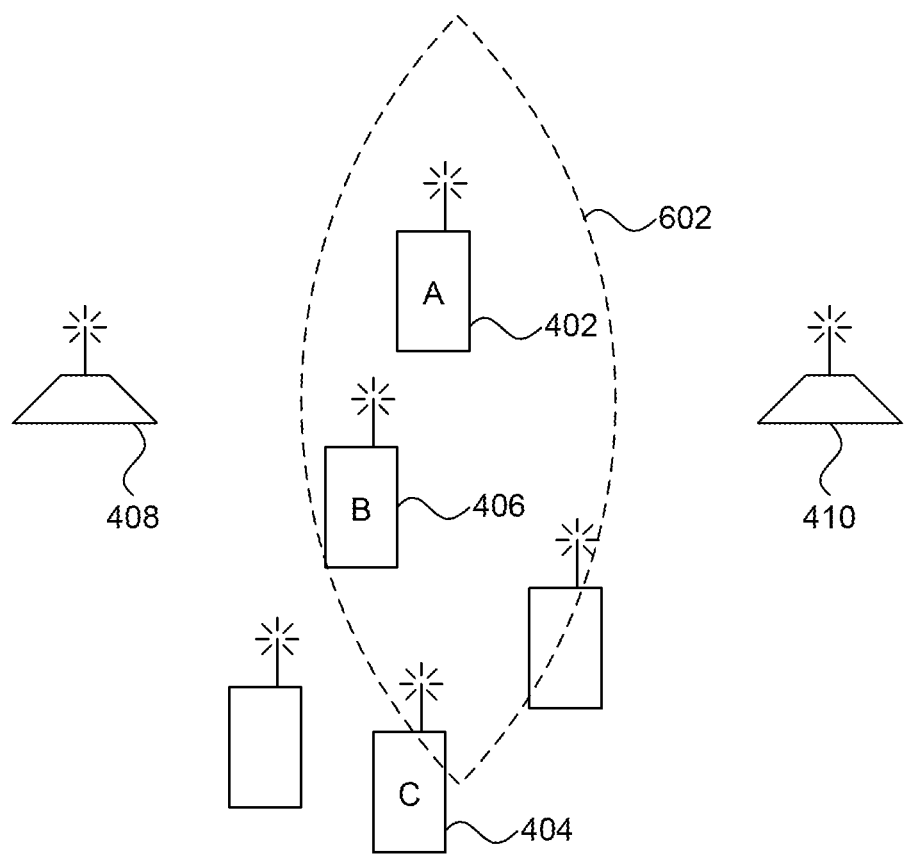
FIG. 6 is a diagram of an exemplary arrangement of devices illustrating safe spaces using proximity-based access control in accordance with the present principles.

Referring now to FIG. 6, the same arrangement of devices is shown, with a safe space 602 established by fixed stations 408 and 410. The safe space 602 is shown herein as being defined by being within a fixed distance of both stations 408 and 410, but any appropriate safe space may be defined. For example, a range of distances from each station may be considered, allowing for substantial variation in the shape and size of the safe space 602. Furthermore, additional fixed stations may be introduced to further limit/shape the safe space 602.

Figure 7:
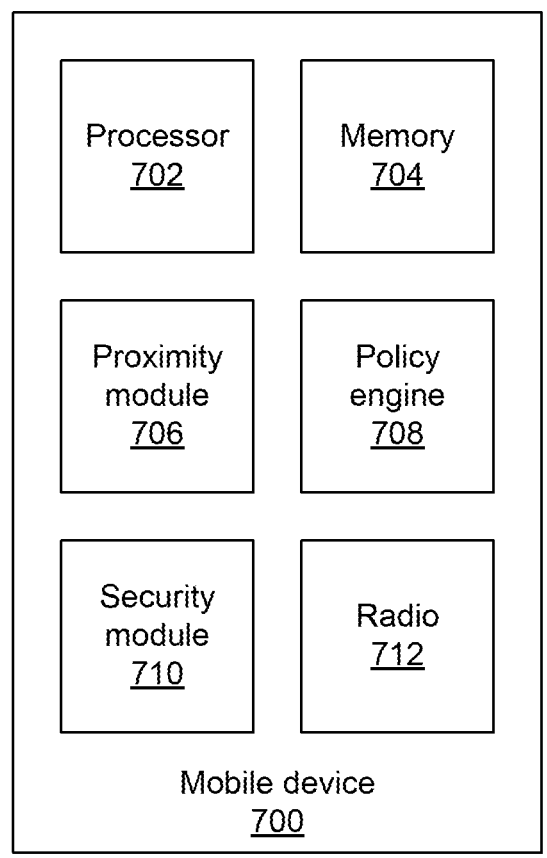
FIG. 7 is a diagram of a system for proximity-based access control in accordance with the present principles.

Referring now to FIG. 7, a diagram of a mobile device 700 is shown. The mobile device 700 includes a proximity module 706 that utilizes the radio 712 to determine the proximity of other mobile devices and fixed stations in the area. The policy engine 708 uses the proximities to determine whether a safe gathering criterion has been met. To accomplish this, the policy engine 708 may use processor 702 to compare the proximities to one or more thresholds stored in memory 704. If a sufficient number of devices are within the threshold, or if the mobile device 700 is within a threshold distance of safe space stations, then policy engine 708 instructs security module 710 to alter a security level of the device 704 according to one or more safe gathering policies stored in memory 704.

The proximity module 706 captures domain specific information about converting information from local radio transceivers into information regarding the users operating the nearby mobile devices, the distance of the devices from mobile device 700, the social and professional relationship between the users, and the location of the device. The proximity module 706 may be connected to other subsystems that contain information regarding calendars, contacts, social network, and a professional network. The proximity module 706 also consults a set of trigger rules that combine all the collected information into a decision to communicate with policy engine 708 about a change in the safe gathering status, such as the convening of a safe gathering, or its adjournment, or the change in the set of attendees.

The policy engine 708 converts the triggers from proximity module 706 into decisions that govern the operation of security module 710. The functions of the security module 710 that may be controlled include, but are not limited to, authentication, re-authentication, access control, etc. The device-level implementation of safe gathering policies may be coupled with a service that provides the ability to determine the identity of the users operating nearby devices, as the service may cross reference input from several devices as well as fixed stations in the area. The proximity module 706 may also directly provide triggers to the policy engine 708, or to a server-side policy engine according to safe gathering rules stored at the server side.

The security module 710 implements one or more authentication systems that verify the identity of the user of the mobile device 700. The security module 710 may use any appropriate authentication system(s) including, but not limited to, passwords, biometrics, digital keyfobs, two-factor authentication, etc. When decreasing a security level according to a safe gathering policy, the security module 710 may decrease a number of authentication systems being used or may decrease the strictness of individual authentication systems.

Having described preferred embodiments of a system and method for social- and proximity-based access control for mobile applications (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer readable storage medium comprising a computer readable program for proximity-based access control, wherein the computer readable program when executed on a computer causes the computer to perform the steps of:
   determining a distance from a first mobile device to each of one or more safe mobile devices which falls below a threshold distance;
   determining, using a processor, a number of safe mobile devices within the threshold distance which exceeds a safe gathering threshold, the safe gathering threshold being a particular number of devices from among the safe mobile devices with threshold number of secret keys sufficient for decryption; and
   activating a safe gathering policy in accordance with the safe gathering threshold that decreases a security level in the first mobile device.

2. A system for proximity-based access control, comprising: a processor device operatively coupled to a memory, the processor device being configured to:
   determine, using a proximity module, a distance from a first mobile device to each of one or more safe mobile devices which falls below a threshold distance;
   determine, using a policy engine comprising a processor, a number of safe mobile devices within the threshold distance which exceeds a safe gathering threshold, the safe gathering threshold being a particular number of devices from among the safe mobile devices with threshold number of secret keys sufficient for decryption; and
   activate, using a security module, a safe gathering policy in accordance with the safe gathering threshold that decreases a security level in the first mobile device.

3. The system of claim 2, wherein the policy engine is further configured to periodically verify that the number of safe mobile devices exceeds the safe gathering threshold and, if not, deactivating the safe gathering policy.

4. The system of claim 2, wherein the security module is further configured to prompt a user of the first mobile device for a decision as to whether to activate the safe gathering policy.

5. The system of claim 2, wherein the proximity module is further configured to receive an identifier and a signal strength magnitude from the safe mobile device.

6. The system of claim 2, wherein the proximity module is further configured to determine whether the first mobile device is physically located within a safe space and the security module is to activate the safe gathering policy further in accordance with presence in the safe space.

7. The system of claim 6, wherein the proximity module is further configured to determine whether the first mobile device is within a threshold range of one or more fixed transmitting stations.

8. The system of claim 6, wherein the proximity module is further configured to access door access logs to determine the identities of people who have entered the safe space.

9. The system of claim 2, wherein safe mobile devices include devices sharing a threshold secret key with the first mobile device and wherein the policy engine is further configured to determine whether enough threshold secret keys are available to meet a decryption threshold.

10. The system of claim 2, wherein the safe gathering policy implements one or more authentication schemes that are less strict than a default authentication scheme.

11. The system of claim 2, wherein the safe gathering threshold is one of a set of safe gathering thresholds having varying levels of safety and wherein activating a safe gathering policy comprises selecting a policy from a set of safe gathering policies in accordance with a corresponding safe gathering threshold.

12. The system of claim 2, wherein the policy engine is further configured to determine whether a meeting is scheduled and wherein the security module is further configured to activate the safe gathering policy further in accordance with a determination that a meeting is scheduled.

13. The computer readable storage medium of claim 1, further comprising periodically verifying that the number of safe mobile devices exceeds the safe gathering threshold and, if not, deactivating the safe gathering policy.

14. The computer readable storage medium of claim 1, wherein activating the safe gathering policy comprises prompting a user of the first mobile device for a decision as to whether to activate the safe gathering policy.

15. The computer readable storage medium of claim 1, wherein determining whether the distance between a safe mobile device and the first mobile device falls below a threshold comprises receiving an identifier and a signal strength magnitude from the safe mobile device.

16. The computer readable storage medium of claim 1, wherein the one or more safe mobile devices comprise at least one identification badge having the ability to send identification signals.

17. The computer readable storage medium of claim 1, further comprising:
   determining whether the first mobile device is physically located within a safe space; and
   activating the safe gathering policy further in accordance with presence in the safe space.

18. The computer readable storage medium of claim 17, wherein determining whether the first mobile device is located in a safe space comprises determining whether the first mobile device is within a threshold range of one or more fixed transmitting stations.

19. The computer readable storage medium of claim 17, wherein determining whether the first mobile device is located in a safe space comprises accessing door access logs to determine the identities of people who have entered the safe space.

20. The computer readable storage medium of claim 1, wherein safe mobile devices include devices sharing a threshold secret key with the first mobile device and wherein determining whether a number of safe mobile devices within the threshold distance exceeds a safe gathering threshold comprises determining whether enough threshold secret keys are available to meet a decryption threshold.

\* \* \* \* \*